April 23, 1957  O. J. B. ORWIN  2,789,685
FLEXIBLE CHAIN CONVEYOR
Filed Feb. 5, 1954
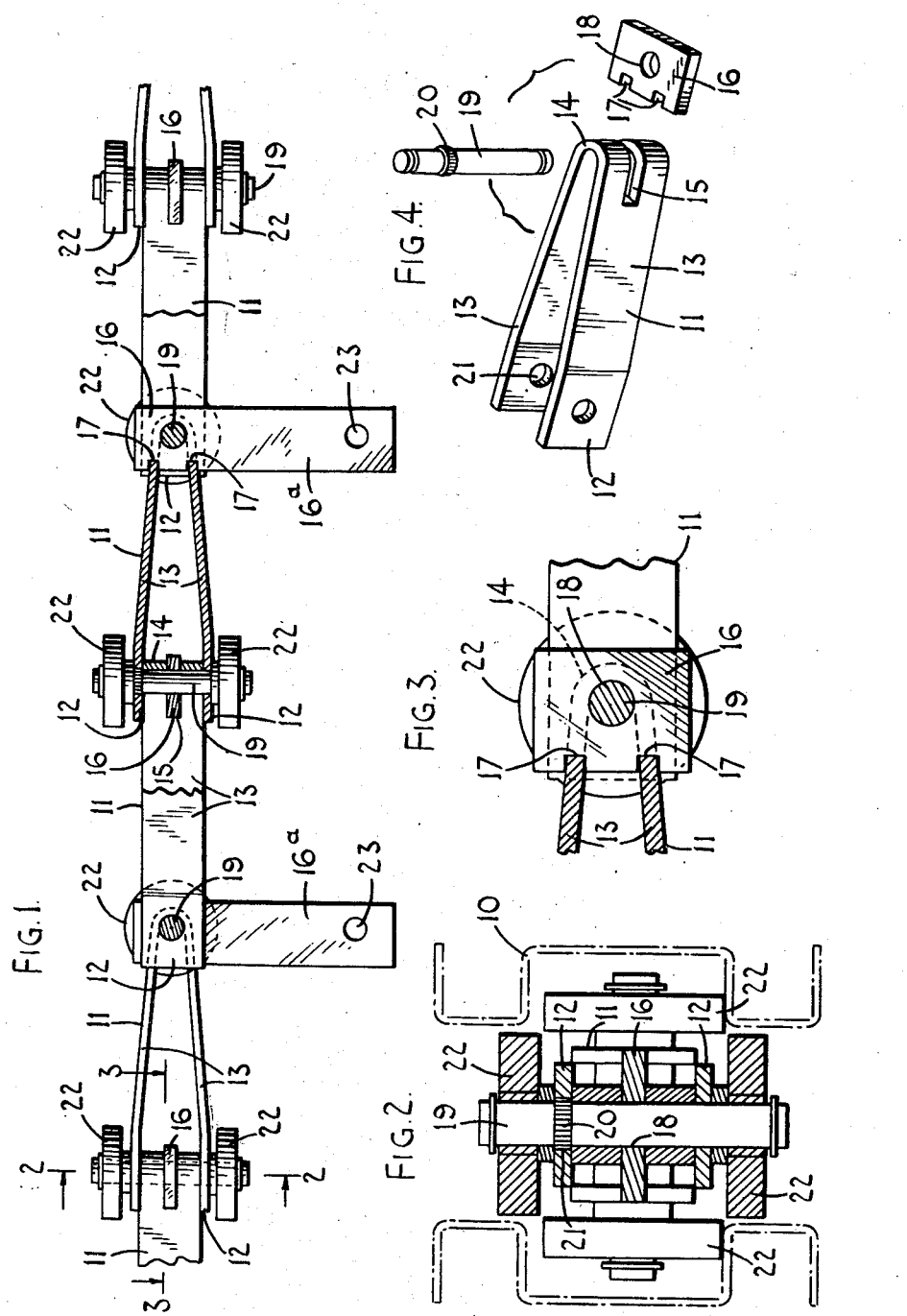
INVENTOR
Olaf John Barclay Orwin
BY A. John Michel
ATTORNEY United States Patent Office 2,789,685
Patented Apr. 23, 1957

2,789,685

FLEXIBLE CHAIN CONVEYOR

Olaf John Barclay Orwin, Quinton, Birmingham, England, assignor to Fisher & Ludlow Limited, Birmingham, England, a British company Application February 5, 1954, Serial No. 408,549

6 Claims. (Cl. 198—177)

This invention relates to chain conveyors for advancing goods and is concerned with such conveyors which are of the kind comprising a conveyor chain built up from a plurality of strip metal links connected pivotally together and provided with track engaging rollers.

In the specification of my U. S. A. Patent No. 2,640,585 I have described a conveyor of the foregoing kind in which the chain links are supported by the rollers at positions adjacent the position at which the links are connected together for relative pivotal movement, the reaction force between the rollers and the track extending in a direction which is parallel to the plane of relative pivoting of the adjacent links so that when the chain passes around a curve the resultant force reaction acting at the point of pivoting in a direction in the plane of pivoting transverse to the length of the adjacent chain links, is provided by the engagement of these rollers with the track without thereby subjecting the chain to bending moment.

With the construction described in the prior specification aforesaid, longitudinally adjacent links are joined together by means of connecting bodies which are separate from the links as well as by means of roller supporting pins which engage with the links and pass in mutually transverse relationship through openings in the connecting bodies, and the mutually transverse pins which pass through each connecting body are spaced apart from one another longitudinally of the chain.

In consequence, in order that the load supporting links such as the links 11 illustrated in Figure 1 of this prior specification may be directly supported at their ends from the track, longitudinally adjacent connecting bodies are arranged with mutually parallel pins in opposed relationship to one another, and in order that the distance between the rollers which are rotatable about vertical axes shall be maintained constant throughout the length of the chain, as is desirable, when, as is customary, the chain is transversing a curve in a horizontal plane, it must necessarily follow that longitudinally adjacent links are of different length.

In other words, considering Figure 1 of the prior specification aforesaid, the links 11 are of a length less than the links 10 in that figure.

Thus such a chain, although supporting the links when passing around curves in the above described way without thereby subjecting the links to bending moment, entails the disadvantage that it entails a relatively large number of differently shaped parts with corresponding increase in the manufacturing and assembly costs of the chain.

The present invention has for its object the provision of a chain of the foregoing kind involving a relatively few number of differently shaped parts in which the links are supported when passing around curves in the manner above described.

According to the present invention each of the links of the chain are of identical overall shape and dimensions, adjacent such links being connected pivotally together by roller supporting pins with the longitudinally adjacent pins in each case mutually transverse, a roller being provided on each end of each pin for rotation about axes which are co-incident with the axis of relative pivoting of adjacent links, the arrangement being such that the pivot between each two pivotally connected links is adapted to be supported against movement in the plane of relative pivoting of the links by the engagement of the adjacent rollers with the track so as thereby to avoid subjecting the chain links themselves to bending movement arising from the reaction between the said rollers and the track.

The invention in a more specific form comprises a conveyor embodying a conveyor chain comprising a plurality of links each formed from strip metal bent to substantially elongated U or V configuration and disposed with the planes of the strip metal arms of each pair of adjacent links in the chain length arranged in mutually transverse relationship, each U- or V-shaped link being formed in the strip metal connecting part thereof joining together the two arms with a slot extending longitudinally of the chain and disposed intermediate the longitudinal edges of the strip metal arms, a bearing member disposed in each of these slots in engagement with the edges of the associated slot which are longitudinal of the chain so as thereby to locate each bearing member against transverse movement in relation to its associated chain link, each bearing member supporting transversely aligned bearing pin portions extending on opposite sides of the bearing member beyond the adjacent edges of the associated strip metal link and through holes in the outer ends of the arms of the adjacent link, rollers on the outer ends of each of the bearing pin portions, at least some of the bearing members forming or carrying load advancing members, said latter bearing members being engaged with their associated link slots in such a manner as to locate these members against pivotal movement relative to such links about the axes of the associated bearing pin portions, the arrangement being such that in a length of chain the bearing pin portions and associated bearing members permit of adjacent links pivoting relatively with the longitudinally adjacent axes of pivoting being mutually perpendicular so as to provide a chain which is flexible in two mutually perpendicular directions transverse to its length.

Such specific form of conveyor chain is especially applicable to the construction of conveyors for advancing loads of relatively light or moderate weight and provides a chain of a particularly simple construction whose manufacturing and assembly costs are particularly low.

The invention as illustrated in the accompanying drawings wherein:

Figure 1 is a part sectional side elevation of a portion of the chain of one form of chain conveyor embodying the present invention.

Figure 2 is a sectional view to an enlarged scale on the line 2—2 of Figure 1 illustrating diagrammatically also the part of the conveyor track.

Figure 3 is a sectional view to an enlarged scale on the line 3—3 of Figure 1.

Figure 4 is a perspective view showing certain of the parts of the chain prior to assembly.

In the drawings the invention is depicted as applied to a conveyor chain for use with a track of cruciform configuration in cross section for example, as described in the specification of my prior U. S. A. Patent No. 2,640,585 such track being indicated diagrammatically at 10 in Figure 2.

The chain is built up from a large number of identical links having identical overall shape and identical overall dimensions and these links which are depicted at 11 are each formed by taking a length of flat rectangular metal strip and bending it to elongated V configuration so that the outer ends 12 of the two arms 13 of each link are disposed in parallel relationship having their opposed inner faces spaced apart by a distance corresponding to the width of the metal strip forming each link with the remaining portions of the two arms of each link converging towards one another in a direction towards their connecting portion 14 which connecting portion is of semi-circular configuration.

The connecting portion 14 of each V-shaped link is formed centrally of the width of the strip with a relatively narrow slot 15 extending longitudinally of the link into the adjacent end of each of the two arms 13, the width of the slot being conveniently of the order of 3/16" in the case where as is particularly convenient, the width of the strip is of the order of 1".

Disposed in each of these slots 15 is a bearing member 16 in the form of a flat rectangular metal plate of thickness equal to the width of the slot so as to be engaged closely on opposite faces by the longitudinal edges of the slot throughout its length.

Each bearing member plate along one of its edges is formed with a pair of spaced grooves 17 of width slightly greater than the thickness of the metal strip forming each link, the grooves being of substantially rectangular configuration and being spaced apart from one another by a distance corresponding to the spacing of the two link arms at the inner end of the slot 15.

Each bearing member 16 is further formed with a circular hole 18 spaced symmetrically in relation to the two grooves and of radius equal to that of the interior of this semi-circular connecting portion 14; the two grooves and the hole in each bearing member being preferably formed simultaneously by a single tool. The arrangement is such that when each bearing member is in position within its associated slot 15, each link arm is in engagement with the base of the corresponding groove 17 and one side of each hole 18 is in alignment with the semi-circular interior of the connecting portion 14 so that when a bearing pin 19 or if desired a liner therefor of peripheral radius corresponding to the radius of the hole is positioned within the hole it engages closely with the semi-circular connecting part surface. Thus each bearing member 16 by its engagement with the bearing pin or liner and by the engagement of its grooves with the link arms is held positively against movement in any direction transverse to the bearing pin axis relative to its associated link and is held against movement in either direction along such axis i. e. transverse to its link by engaging between the sides of the slot 15.

Thus each bearing member 16 on the insertion of the bearing pin is secured rigidly in relation to its associated link.

Each bearing pin prior to assembly in position is knurled at one position 20 along its length as described in my prior specification aforesaid and is inserted through aligned circular holes 21 formed in the parallel outer end 12 of an adjacent link 11 which holes 21 are of diameter corresponding to the diameter of the non-knurled portion of the bearing pin.

Assembly of the parts would be effected by disposing one link with its associated bearing member 16 between the outer ends of the arms of an adjacent link with the planes of the strip metal of these two links mutually perpendicular, the non-knurled end of the pin 19 being inserted first and the pin being driven until its knurled portion engaged within one of the two holes 21 in the adjacent link arms so as thereby to be held against turning in relation to such adjacent link, although being free to pivot within the hole in the bearing member through which it is inserted or to pivot in relation to the liner if provided as above described.

Each bearing pin extends beyond the two link arm holes 21 the projecting portions of the pin having rollers 22 rotatably mounted, for example as described in the prior specification aforesaid for engaging the track 10.

Thus each pin 19 carries a pair of rollers 22 with the axes of longitudinally adjacent pins mutually perpendicular so that longitudinally adjacent pairs of rollers serve as load supporting rollers rotating about horizontal axes or guiding rollers rotating about a vertical axis.

At the same time each longitudinally adjacent pair of pivotal connections between the links 11 permit of adjacent links pivoting relatively about horizontal and vertical axes respectively.

At least some of the bearing members 16 would extend to one side of the chain so as to constitute load advancing members 16a, and as shown, each of the bearing members 16 associated with the load support rollers provide such load advancing members and are formed with load suspension hook receiving holes 23.

The present invention provides a conveyor embodying a conveyor chain of particularly simple and inexpensive construction as will be apparent from the foregoing description, which chain it is believed possesses very good resistance to wear so that the chain may be expected to possess a long life.

What I claim then is:

1. A conveyor of the kind specified provided with a conveyor chain comprising a plurality of links each formed from strip metal bent to substantially elongated U or V configuration and disposed with the planes of the strip metal arms of each pair of adjacent links in the chain length arranged in mutually transverse relationship, each U- or V-shaped link being formed in the strip metal connecting part thereof joining together the two arms with a slot extending longitudinally of the chain and disposed intermediate the longitudinal edges of the strip metal arms, a bearing member disposed in each of these slots in engagement with the edges of the associated slot which are longitudinal of the chain so as thereby to locate each bearing member against transverse movement in relation to its associated chain link, each bearing member supporting transversely aligned bearing pin portions extending on opposite sides of the bearing member beyond the adjacent edges of the associated strip metal link and through holes in the outer ends of the arms of the adjacent link, rollers on the outer ends of each of the bearing pin portions, at least some of the bearing members forming or carrying load advancing members, said latter bearing members being engaged with their associated link slots in such a manner as to locate these members against pivotal movement relative to such links about the axes of the associated bearing pin portions, the arrangement being such that in a length of chain the bearing pin portions and associated bearing members permit of adjacent links pivoting relatively with the longitudinally adjacent axes of pivoting being mutually perpendicular so as to provide a chain which is flexible in two mutually perpendicular directions transverse to its length.

2. A conveyor according to claim 1 wherein the bearing members are themselves adapted to engage directly with both arms of their associated link so as thereby to be locked positively against transverse movement relative to the link under the applied load, the side of each bearing member which is directed towards the outer ends of the arms of the associated link is formed with a pair of spaced transversely extending grooves each of a width corresponding to the thickness of the metal strip forming the link, each groove receiving and engaging with the adjacent inner edge of the slot aforesaid in one of the two link arms; the bearing member being retained with its grooves in such engaging position by its associated bearing pin portions themselves engaging either directly or through the medium of an associated liner with the inner surface of the connecting portion which joins together the two link arms.

3. A conveyor of the kind specified wherein each of the links of the conveyor chain are of identical overall shape and dimensions and are formed from strip metal bent to substantially elongated U- or V-configuration with the planes of the strip metal arms of each pair of adjacent links in the chain length arranged in mutually transverse relationship, each link being formed in the strip metal connecting part thereof joining together the two arms with a slot extending longitudinally of the chain and disposed intermediate the longitudinal edges of the strip metal arms, a bearing member being disposed in each of these slots in engagement with the edges of the associated slot which are longitudinal of the chain so as thereby to locate each bearing member against transverse movement in relation to its associated chain link, each bearing member supporting transversely aligned bearing pin portions extending on opposite sides of the bearing member beyond the adjacent edges of the associated strip metal link and through holes in the outer ends of the arms of the adjacent link, rollers on the outer ends of each of the bearing pin portions, and supported for rotation about axes which are co-incident with the axis of adjacent links, at least some of the bearing members forming or carrying load advancing members, said latter bearing members being engaged with their associated link slots in such a manner as to locate these members against pivotal movement relative to such links about the axes of the associated bearing pin portions.

4. A conveyor of the kind specified wherein the conveyor chain comprises a plurality of links each formed from strip metal bent to substantially elongated U- or V-configuration with the edges of the strips at the connecting part joining together the two arms of each link of plain unrecessed configuration, the links being disposed with the planes of the strip metal arms of each pair of adjacent links in the chain length arranged in mutually transverse relationship, each of the U- or V-shaped links constituting the chain being formed in the strip metal connecting part thereof joining together the two arms with a slot extending longitudinally of the chain and disposed intermediate the longitudinal edges of the strip metal arms, a bearing member disposed in each of these slots, each bearing member being formed with a hole through which extends a bearing pin the end portions of which project on opposite sides of the bearing member beyond the adjacent edges of the associated strip metal link and through holes in the outer ends of the arms of the adjacent link, a track engaging roller on each end of each bearing pin rotatable about the axis of the pin, each bearing member being in engagement with each of the edges of the associated slot, each bearing pin being adapted to engage with the inner surface of the connecting portion which joins together the two arms of each link, some of said bearing members constituting load supporting members, and means locating said latter bearing members against pivotal movement relative to their associated links about the axis of the associated bearing pins.

5. A conveyor of the kind specified wherein the conveyor chain comprises a plurality of links each formed from strip metal bent to substantially elongated U- or V-configuration with the edges of the strips at the connecting part joining together the two arms of each link of plain unrecessed configuration, the links being disposed with the planes of the strip metal arms of each pair of adjacent links in the chain length arranged in mutually transverse relationship, each of the U- and V-shaped links constituting the chain being formed in the strip metal connecting part thereof joining together the two arms with a slot extending longitudinally of the chain and disposed intermediate the longitudinal edges of the strip metal arms, a bearing member disposed in each of these slots, each bearing member being formed with a hole through which extends a bearing pin the end portions of which project on opposite sides of the bearing member beyond the adjacent edges of the associated strip metal link and through holes in the outer ends of the arms of the adjacent link, a track engaging roller on each end of each bearing pin rotatable about the axis of the pin, each bearing member being in engagement with each of the edges of the associated slot, each bearing pin being adapted to engage with the inner surface of the connecting portion which joins together the two arms of each link, some of said bearing members constituting load supporting members, the side of each bearing member which is directed towards the outer end of the arms of the associated link being formed with a pair of grooves spaced apart along such bearing member side, each groove having a width corresponding to the thickness of the metal strip forming the link and receiving and engaging with the corresponding end of the link slot in which the bearing member is disposed.

6. A conveyor according to claim 4 wherein each bearing pin is non-rotatable within the holes in the arms of the next adjacent link to which it is connected for the purpose specified.

References Cited in the file of this patent
UNITED STATES PATENTS
2,187,498     Landahl _____ Jan. 16, 1940